United States Patent
Weissler et al.

(10) Patent No.: US 12,081,693 B2
(45) Date of Patent: Sep. 3, 2024

(54) MOBILE DEVICE DISTRACTION MANAGEMENT

(71) Applicant: DRIVING MANAGEMENT SYSTEMS, INC., Colorado Springs, CO (US)

(72) Inventors: Paul N. Weissler, Colorado Springs, CO (US); Kyle Johnson, Colorado Springs, CO (US); Robert M. Azzi, Colorado Springs, CO (US); Laura P. T. Johnston, Colorado Springs, CO (US)

(73) Assignee: DRIVING MANAGEMENT SYSTEMS, INC., Colorado Springs, CO (US)

( * ) Notice: Subject to any disclaimer, the term of this patent is extended or adjusted under 35 U.S.C. 154(b) by 0 days.

(21) Appl. No.: 18/562,031

(22) PCT Filed: May 24, 2021

(86) PCT No.: PCT/US2021/033845
§ 371 (c)(1),
(2) Date: Nov. 17, 2023

(87) PCT Pub. No.: WO2022/250646
PCT Pub. Date: Dec. 1, 2022

(65) Prior Publication Data
US 2024/0223693 A1    Jul. 4, 2024

(51) Int. Cl.
*H04M 1/72463* (2021.01)
*H04B 17/318* (2015.01)
*H04M 1/72409* (2021.01)
*H04M 1/72457* (2021.01)
*H04W 4/48* (2018.01)

(52) U.S. Cl.
CPC ...... *H04M 1/72463* (2021.01); *H04B 17/318* (2015.01); *H04M 1/724098* (2022.02); *H04M 1/72457* (2021.01); *H04W 4/48* (2018.02)

(58) Field of Classification Search
CPC ....... H04M 1/72463; H04M 1/724098; H04M 1/72457; H04B 17/318; H04W 4/48
See application file for complete search history.

(56) References Cited

U.S. PATENT DOCUMENTS

| | | | |
|---|---|---|---|
| 10,477,454 B2 | 11/2019 | Breaux et al. | |
| 10,672,249 B1 | 6/2020 | Balakrishnan et al. | |
| 2016/0088469 A1* | 3/2016 | Racha | H04W 4/48 455/418 |
| 2017/0006151 A1 | 1/2017 | Doorandish | |

(Continued)

OTHER PUBLICATIONS

International Search Report and Written Opinion for PCT/US2021/033845, mailed Sep. 9, 2021.

*Primary Examiner* — Farid Seyedvosoghi
(74) *Attorney, Agent, or Firm* — WARNER NORCROSS + JUDD LLP

(57) ABSTRACT

A method for managing user interactions with a mobile device is provided. The method generally includes the use of notifications and VoIP calls to prompt a user to return to a smartphone application while within a vehicle. The smartphone application, when active as the foreground application, provides a virtual barrier between the driver and other applications, while permitting navigation and call functionality, for example.

20 Claims, 3 Drawing Sheets

(56) References Cited

U.S. PATENT DOCUMENTS

2019/0158654 A1      5/2019   Way et al.
2019/0182749 A1*     6/2019   Breaux ................. H04W 4/027
2019/0349470 A1*    11/2019   Abramson .............. H04W 4/48

* cited by examiner

MOBILE DEVICE DISTRACTION MANAGEMENT

FIELD OF THE INVENTION

The present invention relates to a method for managing driver interactions with a mobile device, and in particular, an iOS mobile device.

BACKGROUND OF THE INVENTION

Distracted driving includes any activity that diverts attention from the primary task of driving. As mobile devices have become ubiquitous in modern society, efforts to mitigate distracted driving have gained increased emphasis. For example, social media applications, group chats, texting, and internet browsing can divert attention from the road and add to a driver's cognitive workload. Particularly among commercial vehicle fleets, it is preferable to disable some or all of these smartphone applications while simultaneously permitting calls and navigation functions. Mobile devices that are used by fleet drivers may be provided by the fleet operator and managed by a Mobile Device Management System (MDM) or may be personal devices used by the driver.

There exists a number of methods for limiting access to selected functions on mobile devices. For mobile devices running an Android operating system (OS), a third-party software application can fully control the home screen to limit access to only whitelisted applications. For mobile devices running iOS, however, this functionality is generally not available. Applications on iOS mobile devices can be closed by the user at any time, and applications cannot determine which other application is currently in the foreground and in use. An existing solution for iOS mobile devices includes an opt-in Do Not Disturb that locks the device entirely. However, this mode requires voluntary action by the driver and can be exited at any time while driving. Further, it is desirable to allow the limited use of some applications while the vehicle is in motion, for example navigation applications and call functionality.

Accordingly, there remains a continued need for a method for selectively preventing access to certain applications for mobile devices, including mobile devices running iOS, to limit distractions caused by a mobile device while driving.

SUMMARY OF THE INVENTION

A method for managing user interactions with a mobile device is provided. The method generally includes the use of notifications and VoIP calls to prompt a user to return to a smartphone application while within a vehicle. The smartphone application, when active as the foreground application, provides a virtual barrier between the driver and other applications, while permitting navigation and call functionality.

In one embodiment, the method includes determining that the smartphone application is running as a background application while the mobile device is in proximity to a vehicle beacon. The method then includes generating successive local notifications-including banner alerts and sound alerts—at the mobile device to prompt the user to restore the smartphone application to the device foreground. If the user does not return to the smartphone application, the method includes generating a simulated voice over internet protocol (VOIP) call that, when accepted, causes the mobile device to run the smartphone application as the foreground application. If, however, the user declines the VoIP call, the method includes generating further VoIP calls until accepted by the user, thereby returning the smartphone application to the foreground of the mobile device.

In another embodiment, the method includes notifying a backend server that the mobile device is powered on and in range of a vehicle beacon but that the smartphone application is not running or has been terminated by the user. The method then includes initiating a remote notification from the backend server in the form of a VoIP call. The VOIP call causes the smartphone application to automatically launch. If the call is declined, the smartphone application runs as a background application, and if the call is accepted, the smartphone application runs as the foreground application. The method proceeds to monitor the status of the smartphone application as running as the foreground application or as a background application. When running as the foreground application, the smartphone application prevents interaction with other smartphone functionality while permitting access to limited functionality, including navigation and call functionality.

The method of the present invention prevents certain driver interactions with a mobile device using local notifications and VoIP calls to render most smartphone applications effectively unusable while within a moving vehicle. During this time, the driver can continue to receive banner alerts with turn-by-turn navigation instructions, while also retaining call functionality. The present invention is uniquely tailored for iOS devices, providing a robust alternative to autonomous single app mode (ASAM) and MDM policy control solutions, but can be used across Android devices as well. The use of the mobile device to make and receive phone calls can also be monitored to prevent distracted driving. If the driver is on a call while in motion, the smartphone application can initiate a continuous stream of push notifications, making it difficult or impractical for the driver to continue with the call. The smartphone application can also detect when the mobile device screen is turned off using a combination of timing and screen brightness. When the screen is off, no notifications are presented to prevent distracting the driver unnecessarily.

These and other features of the invention will be more fully understood and appreciated by reference to the description of the embodiments and the drawings.

DETAILED DESCRIPTION OF THE CURRENT EMBODIMENT

As discussed herein, the current embodiment relates to a method for managing certain user interactions with a mobile device, optionally an iOS mobile device. The method generally includes the use of notifications and actual or simulated VoIP calls to generate a virtual barrier around smartphone applications while within a moving vehicle. Though described below in connection with an iOS mobile device, the present method is well suited for other mobile devices, including Android mobile devices.

Figure 1:
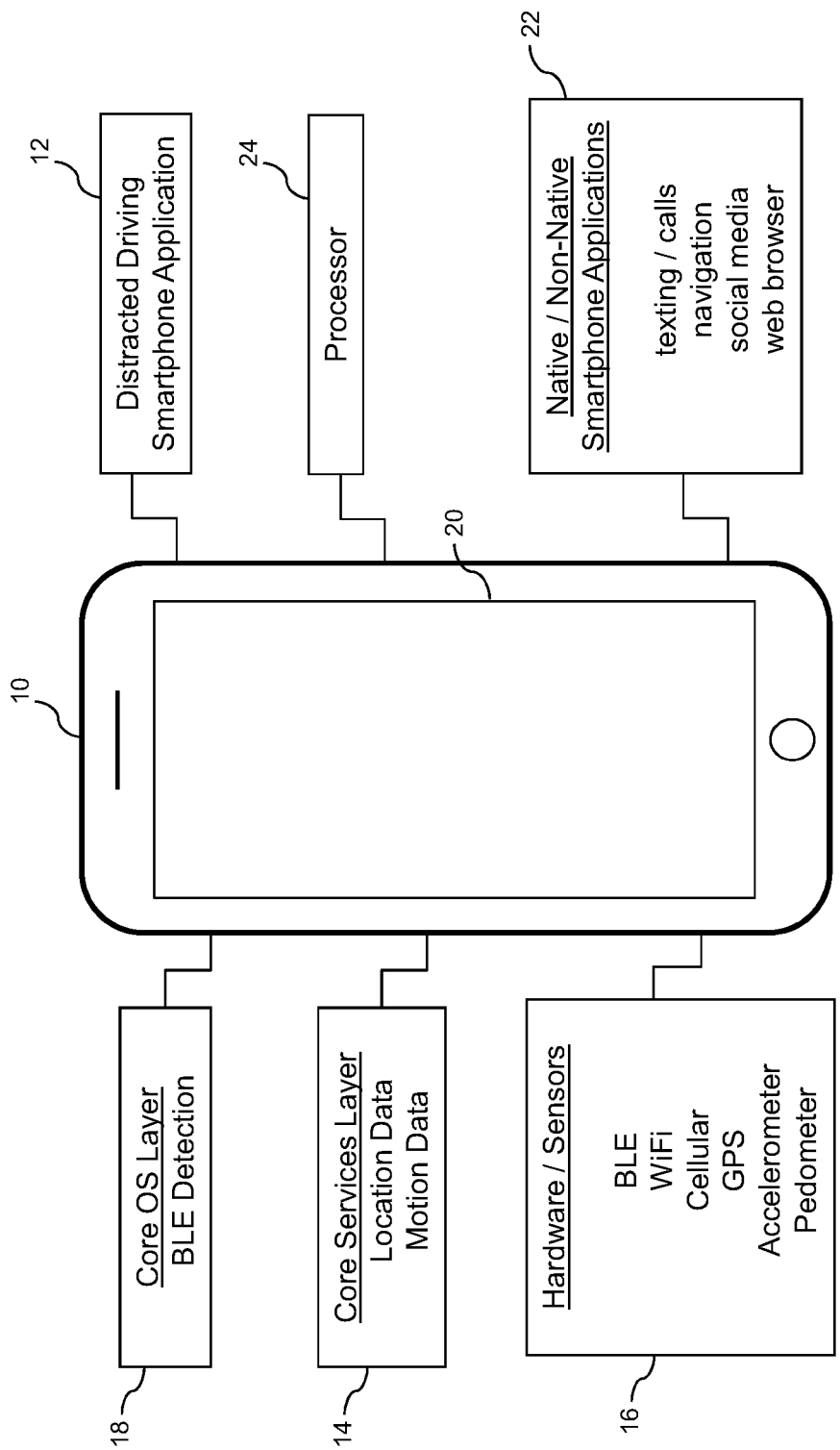
FIG. 1 is a mobile device for use with a method of managing driver interactions with the mobile device in accordance with one embodiment.

Before the method is discussed in detail, a system architecture for implementation of the method is provided. Referring to FIG. 1, the system architecture according to one embodiment includes a mobile device 10. The mobile device 10 includes a distracted driving smartphone application 12 that operates in an application layer of the mobile device. The smartphone application 12 monitors certain functionality of the mobile device 10. For example, the smartphone application 12 receives location information from the Core Location Framework of the Core Services Layer 14. The Core Location Framework provides the mobile device's geographic location to the smartphone application 12, the geographic location being derived from one or more sensors 16, for example GPS, WiFi, Bluetooth, and cellular hardware. The smartphone application 12 also receives motion information from the Core Motion Framework of the Core Services layer 14. The Core Motion Framework provides motion-related data from onboard sensors 16, including accelerometers, gyroscopes, and/or pedometers. The mobile device 10 can also include a Core OS Layer 18 and a touch screen 20. The Core OS Layer 18 supports Bluetooth detection, and the touch screen 20 provides a graphical-user-interface (GUI) for interaction with one or more third-party applications 22 (native or non-native) that are also resident on the application layer of the mobile device, including navigation applications, texting applications, social media applications, and internet browsers. The smartphone application 12 and the third-party applications 22 are executable by the mobile device processor 24 as the foreground application or as one of several background applications.

Figure 2:
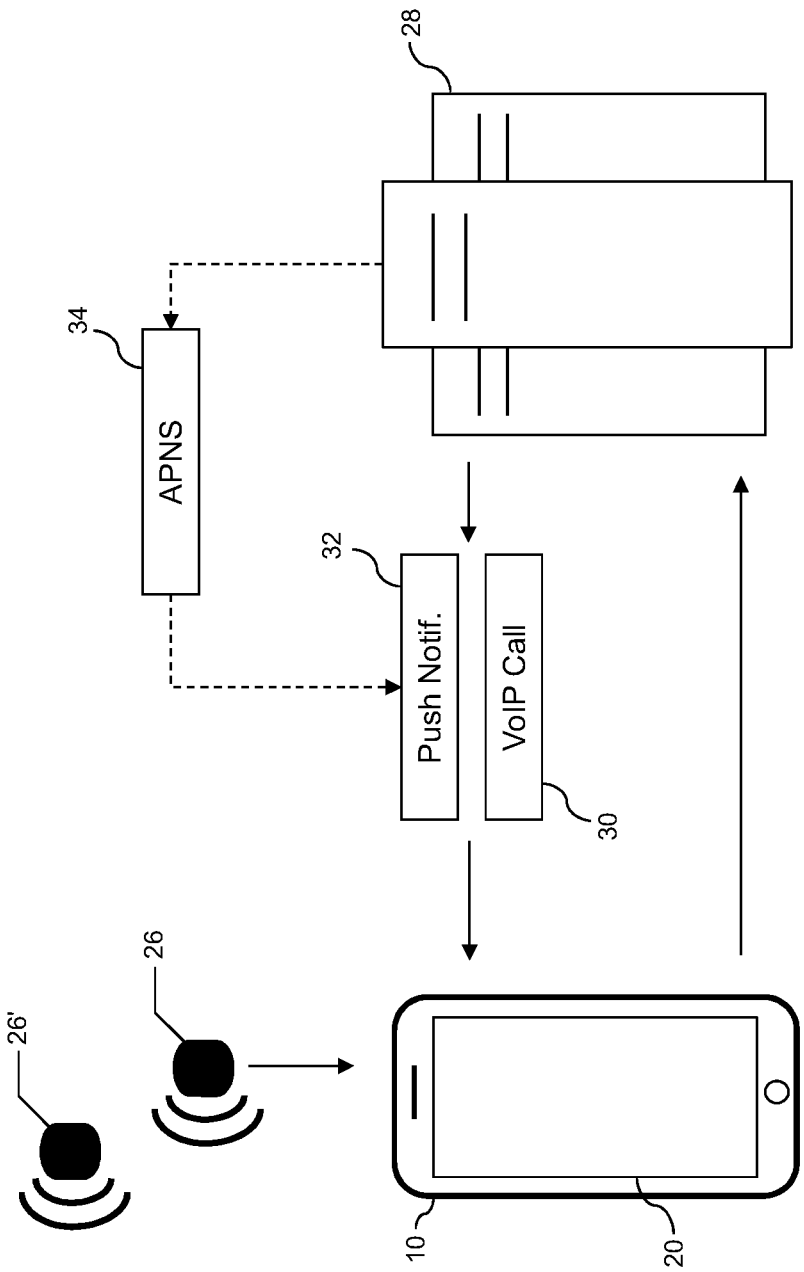
FIG. 2 is a system diagram for a method of managing driver interactions in accordance with one embodiment of the invention.

As shown in FIG. 2, the system architecture includes one or more network beacons 26, 26' located within a vehicle interior for wireless communication with the mobile device 10. The network beacons 26, 26' can be adapted to broadcast one or more RF signals to the mobile device 10. For example, a Bluetooth Low Energy (BLE) network beacon can broadcast short-range data packets at regular intervals that are detected at the Core OS layer 18 of the mobile device 10. Each data packet can contain a unique identifier (UID) associated with the BLE beacon. The received signal strength indicator (RSSI) can be used by the smartphone application 12 to determine relative location within a vehicle interior. For example, an RSSI from a single BLE beacon that is above a predetermined threshold can indicate the presence of a mobile device 10 within a vehicle cab. In other embodiments the vehicle cab can include two or more BLE beacons 26, 26'. The BLE beacon 26, 26' with the highest RSSI can represent the BLE beacon closest to the mobile device 10, which can be used to determine the relative location of the mobile device.

As also shown in FIG. 2, the smartphone application 12 is in data communication with a backend server 28. The backend server 28 includes machine readable instructions that, when executed, cause the backend server 28 to deliver a remote notification to the mobile device 10 if a preselected criteria is met. The preselected criteria can include, for example, the smartphone application is terminated by the user. Other criteria can include proximity of the mobile device 10 to an in-vehicle beacon for a predetermined minimum time period while the smartphone application 12 is not running. The backend server 28 can respond with a remote notification, for example a VoIP call 30 or a push notification 32, to cause the smartphone application 12 to automatically launch. The backend server 28 can optionally initiate the remote notification through an Application Programming Interface (API). For example, the backend server 28 can cause an Apple Push Notification Service (APNS) 34 to send a remote notification to cause the smartphone application 12 to automatically launch. Alternatively, local notifications, which can include an escalating series of banner alerts and simulated VoIP calls, can be used to prompt the user to bring the smartphone application 12 to the foreground of the mobile device touch screen 20 while within range of an in-vehicle beacon 26, 26'. Once the smartphone application 12 is returned to the foreground, the user can receive banner alerts with turn-by-turn navigation instructions for a given route, while also retaining call functionality.

Figure 3:
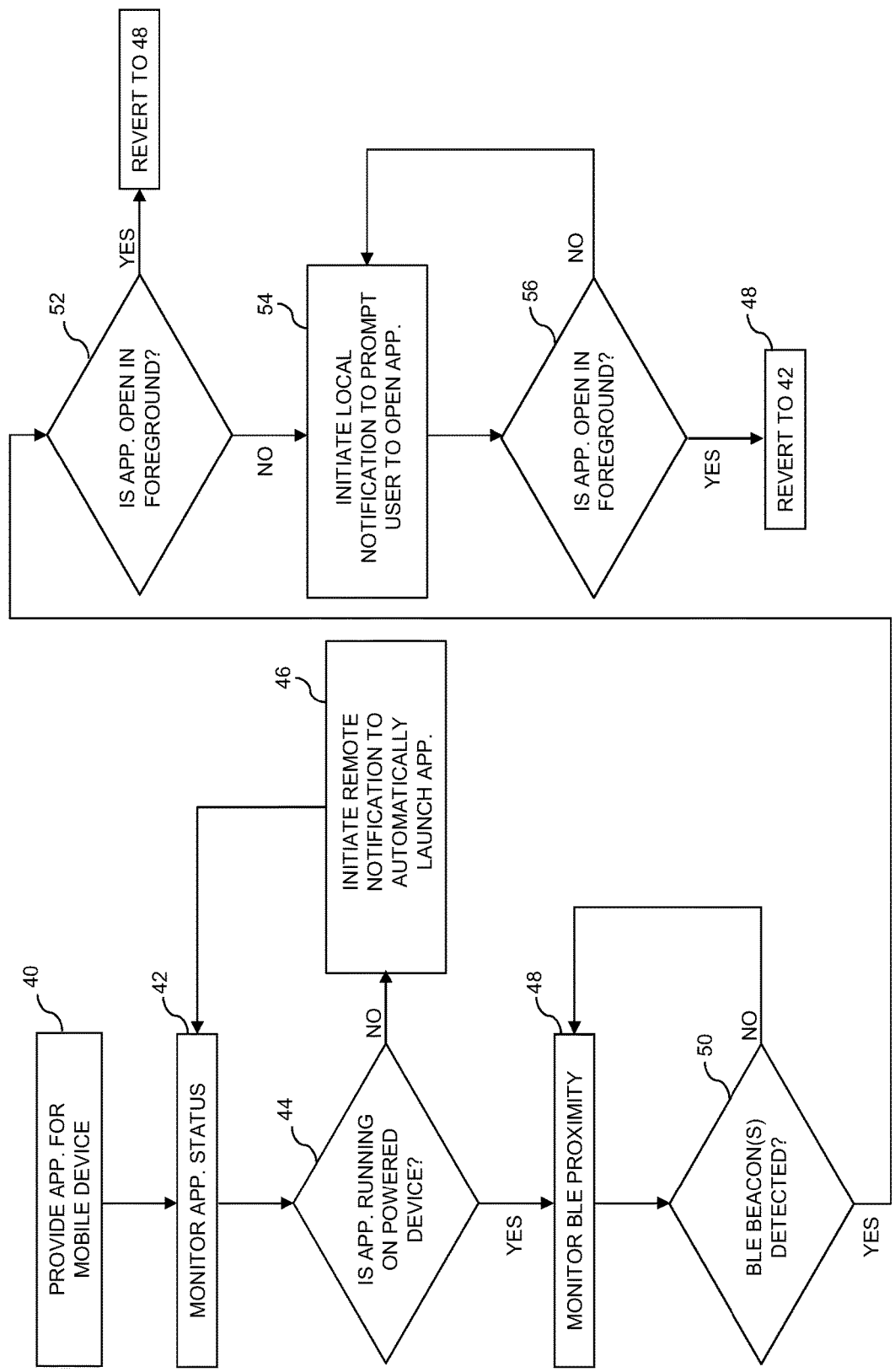
FIG. 3 a flow chart for a method of managing driver interactions with a mobile device in accordance with one embodiment of the invention.

Referring now to FIG. 3, a flow chart depicts a method of managing driver interactions with a mobile device 10 with local notifications and remote notifications. The method generally includes providing a distracted driving smartphone application 12 for execution by the mobile device 10 at step 40. The mobile device 10 is adapted to detect a beacon signal, extract beacon data, and pass the beacon data to the smartphone application 12, all of which are typically performed at the Core OS Layer 18 of the mobile device operating system. The mobile device 10 is also adapted to detect movement and location data of the mobile device 10 and pass the movement and location data to the smartphone application 12, all of which are typically performed at the Core Services Layer 14 of the mobile device operating system.

At step 42, the method includes monitoring the operating status of smartphone application 12. At decision step 44, the method includes determining whether the smartphone application 12 is running (as the foreground application or as a background application) on the mobile device 10. If the smartphone application 12 is not running, the application will launch automatically at step 46. If the smartphone application is running at decision step 44, the method includes monitoring for a predetermined criteria at step 48. In the present embodiment, the predetermined criteria includes proximity to one or more network beacons within a vehicle interior, for example BLE beacons, which indicates the presence of the mobile device 10 within the vehicle. In particular, the smartphone application determines whether an in-vehicle beacon is detected with at least a minimum RSSI. In other embodiments, the predetermined criteria includes a minimum speed, for example at least 5 mph. In still other embodiments, the predetermined criteria includes proximity to one or more in-vehicle beacons in combination with a minimum speed. If the predetermined criteria is not detected at decision step 50, the method reverts to step 48. If however the predetermined criteria is detected at decision step 50, indicating the mobile device is present within a (moving) vehicle, the method proceeds to decision step 52.

At decision step 52, the method includes determining if the smartphone application 12 is running as the foreground application, which would prevent driver interactions with other applications—with the exception of call and navigation functionality. As used herein, an application running in the "foreground" or "foreground application layer" is an open application whose user interface (UI) is visible on the touch screen display. As also used herein, an application running in the "background" or "background application layer" is an open application whose UI is not visible on the touch screen display (e.g., when a user exits a given application without closing, it reverts to the background). If the smartphone application 12 is not running in the foreground, the smartphone application 12 initiates a local notification at step 54. The local notification can include a banner alert to prompt the user to return to the smartphone application 12. If the user does not return to the smartphone application 12 at decision step 52, the method includes initiating a further local notification, in a continuous loop, until use of the mobile device 10 becomes impractical.

The local notifications can initially include alerts, sounds, or badges, each being intended to prompt the driver to return to the distracted driving smartphone application 12. The frequency of the local notifications can escalate through two or more levels in order to render the use of the mobile device 10 impractical. The local notifications include a simulated VOIP call to the mobile device. If the user declines the simulated VOIP call, a further VoIP call is initiated. If however the user answers the simulated VOIP call, the smartphone application 12 is automatically brought to the foreground. The call automatically terminates after an abbreviated period, for example several seconds. The smartphone application 12 provides a virtual barrier to other applications and includes limited visual information so as to not impact the driver's cognitive workload while the vehicle is moving. The simulated VoIP call can deliver the automated or pre-recorded message to the driver, for example reminding the driver to run the smartphone application at all times while driving. Other automated or pre-recorded messages are possible in other embodiments.

To reiterate, the method of the present invention prevents certain user interactions with a mobile device by initiating alerts, sounds, badges, and VoIP calls to render other smartphone applications effectively unusable while within a vehicle. The present invention is uniquely tailored for iOS devices, providing a robust alternative to ASAM and MDM policy solutions, but can be used across Android devices as well. The use of the mobile device 10 to make and receive phone calls can also be monitored to prevent distracted driving. If the driver is on a call while in motion for a predetermined time period, the smartphone application 12 can initiate a continuous stream of push notifications, making it difficult or impractical for the driver to continue with the call. The smartphone application 12 can also detect when the mobile device screen is turned off, optionally using a combination of timing and screen brightness.

In these and other embodiments, the smartphone application 12 can require certain smartphone settings to enable proper functionality. For example, the smartphone settings can include the following: Bluetooth (on), Location Services (always on), Cellular Data (on), and Notifications (on). If the smartphone settings are not configured correctly, the smartphone application 12 reports a non-conforming setting status to a cloud service. When in receipt of this information, the cloud service can generate reports and/or compliance alerts, optionally in real time. For example, the cloud service can immediately notify an enterprise of an improper setting configuration by a commercial driver, potentially prompting a call to the driver. The cloud service can also notify desired parties of the following events: termination of the smartphone application 12, movement of the smartphone application 12 to the background, a lost GPS signal, or the use of the smartphone to place an emergency call. These events can prompt a range of desired actions in real time, optionally immediately upon receipt of this information. For example, in the case of a lost GPS signal (which occurs in tunnels and is out of the user's control), the smartphone can unlock, temporarily permitting full access to smartphone functionality until the GPS signal is restored and all conditions are met to safely re-lock the smartphone. This information can also form the basis for reports, providing enterprises with additional tools for incentivizing and tracking good driving habits while detecting and correcting back driving habits.

To further illustrate the versatility of the present invention, three possible examples are presented below. These examples are intended to be non-limiting, and the present method can be used in other examples as desired.

Example 1

In one example, a commercial driver includes an iOS mobile device. The mobile device is powered on and is within range of an in-vehicle BLE beacon, but the driver has not launched the distracted driving smartphone application. In this case, the application will automatically launch itself within a short time frame and will operate in the background until brought to the foreground by the user. Once in the foreground, the distracted driving smartphone application provides a virtual barrier between the driver and other smartphone applications that may otherwise add to the driver's cognitive workload.

Example 2

In another example, a commercial driver includes an iOS mobile device with the distracted driving smartphone application running as a background application. When within a vehicle cab, the smartphone application detects proximity to an in-vehicle BLE beacon. The smartphone application initiates a local notification in the form of banner alerts, sounds, or badges that prompt the driver to return to the smartphone application as the foreground application when the vehicle is in motion. If the driver does not return to the smartphone application after a predetermined time period has elapsed, the smartphone application initiates a simulated VOIP call to the mobile device, which interrupts any third-party application operating in the foreground application layer. By accepting the simulated VOIP call, which can contain an automated or pre-recorded message to the driver, the mobile device brings the smartphone application to the foreground. As in the prior example, the smartphone application provides a virtual barrier between the driver and other smartphone applications that may otherwise add to the driver's cognitive workload.

Example 3

In another example, a commercial driver includes an iOS mobile device that is administered as part of an MDM program. The mobile device includes a distracted driving smartphone application and an ASAM policy. The ASAM policy includes instructions that trigger a VoIP call from a cloud server when the smartphone application is terminated on an iOS device that is connected to an in-vehicle BLE beacon. If the driver accepts the VOIP call, the iOS device brings the distracted driving smartphone application to the foreground. If the driver ignores the VoIP call, the distracted driving smartphone application launches as a background application. As the vehicle begins moving, the distracted driving smartphone application initiates a local notification to prompt the driver to open the distracted driving smartphone application which, if ignored, results in a simulated VOIP call as in Example 2 above. Once the distracted driving smartphone application is running as the foreground application in ASAM mode, the remaining applications are locked out. An MDM server can also generate manual calls to the mobile device containing automated or pre-recorded messages of essentially any kind.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for preventing certain user interactions with a mobile device, the method comprising: providing a distracted driving smartphone application for execution by the mobile device;
   detecting, at the mobile device, one or more signals from an in-vehicle network beacon;
   determining that the distracted driving smartphone application is not running as a foreground application while within range of the in-vehicle network beacon; generating a plurality of local notifications at the mobile device to prompt a user to return to the distracted driving smartphone application, the plurality of local notifications including a banner alert or a sound alert; and
   following the plurality of local notifications, generating a simulated Voice over Internet Protocol (VOIP) call that, when answered, causes the mobile device to run the distracted driving smartphone application as the foreground application.

2. The method of claim 1 wherein the plurality of local notifications include multiple local notifications that are generated with increasing frequency.

3. The method of claim 1 wherein the simulated VOIP call is a first VOIP call, the method further including immediately generating a second VoIP call in response to the user declining the first VoIP call.

4. The method of claim 1 wherein the simulated VoIP call includes an automated or pre-recorded message to the user of the mobile device.

5. The method of claim 1 wherein the in-vehicle network beacon is a BLE beacon.

6. The method of claim 5, the method further including measuring the received signal strength from the BLE beacon.

7. The method of claim 1 further including notifying a backend server that the mobile device is within range of the in-vehicle network beacon and the distracted driving smartphone application has been terminated by the user.

8. The method of claim 7 further including notifying the backend server that the mobile device has moved at least a minimum distance.

9. The method of claim 1 further including launching the distracted driving smartphone application in response to the signals from the in-vehicle network beacon.

10. The method of claim 1 further including launching the distracted driving smartphone application in response to detecting movement of the mobile device.

11. A mobile device comprising:
    a processor; and
    a memory storing computer-executable instructions that, when executed by the processor, cause the mobile device to perform the following:
    detect one or more signals from an in-vehicle beacon;
    determine that a distracted driving smartphone application installed on the mobile device is not running in a foreground application layer of the mobile device while the mobile device is within a predetermined range of the in-vehicle beacon;
    generate a plurality of local notifications at the mobile device to prompt a user to return to the distracted driving smartphone application, the plurality of local notifications including at least one of a banner alert or a sound alert followed by a simulated Voice over Internet Protocol (VOIP) call that, when answered, causes the processor to run the distracted driving smartphone application in the foreground application layer of the mobile device to thereby prevent interaction with other smartphone applications.

12. The mobile device of claim 11 wherein the simulated VOIP call includes an automated or pre-recorded message to the user of the mobile device.

13. The mobile device of claim 11 wherein the simulated VOIP call is a first VOIP call, the machine-executable instructions causing the processor to generate a second VOIP call in response to the user declining the first VOIP call.

14. The mobile device of claim 11 wherein the machine-executable instructions cause the processor to measure the received signal strength from the in-vehicle beacon.

15. The mobile device of claim 11 wherein the machine-executable instructions cause the processor to notify a backend server that the mobile device is within range of the in-vehicle beacon.

16. The mobile device of claim 11 wherein the machine-executable instructions cause the processor to notify a backend server that the mobile device has moved at least a minimum distance.

17. A method for preventing certain user interactions with a mobile device, the method comprising:
    receiving, at a backend server, signals indicative of the proximity of the mobile device to an in-vehicle beacon;
    determining, at the backend server, that the mobile device is not running a distracted driving smartphone application that is installed on the mobile device; and
    causing an application programming interface to initiate a Voice over Internet Protocol (VOIP) call to the mobile device that causes the mobile device to automatically launch the distracted driving smartphone application as a background application.

18. The method of claim 17 wherein the VoIP call includes an automated or pre-recorded message to the user of the mobile device.

19. The method of claim 17 wherein the VOIP call is a first VOIP call, the method further including causing an application programming interface to initiate a second VoIP call to the mobile device in response to the user declining the first VoIP call.

20. The method of claim 19 wherein the mobile device is an iOS mobile device and wherein the application programming interface includes an Apple Push Notification Service.

* * * * *